(12) United States Patent
Oka

(10) Patent No.: US 11,283,094 B2
(45) Date of Patent: Mar. 22, 2022

(54) FUEL CELL AND METHOD FOR MANUFACTURING THE FUEL CELL

(71) Applicant: TOYOTA JIDOSHA KABUSHIKI KAISHA, Toyota (JP)

(72) Inventor: Noritoshi Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 16/804,942

(22) Filed: Feb. 28, 2020

(65) Prior Publication Data

US 2020/0280085 A1 Sep. 3, 2020

(30) Foreign Application Priority Data

Mar. 1, 2019 (JP) .............................. JP2019-037618

(51) Int. Cl.
| | |
|---|---|
| *H01M 8/1004* | (2016.01) |
| *H01M 8/0297* | (2016.01) |
| *H01M 8/242* | (2016.01) |
| *H01M 8/0239* | (2016.01) |

(52) U.S. Cl.
CPC ....... *H01M 8/1004* (2013.01); *H01M 8/0239* (2013.01); *H01M 8/0297* (2013.01); *H01M 8/242* (2013.01)

(58) Field of Classification Search
CPC ............. H01M 8/1004; H01M 8/0239; H01M 8/0297; H01M 8/242
See application file for complete search history.

(56) References Cited

U.S. PATENT DOCUMENTS

| | | | | |
|---|---|---|---|---|
| 2002/0192532 | A1* | 12/2002 | Inagaki ............... | H01M 8/0228 429/492 |
| 2013/0266887 | A1* | 10/2013 | Norimoto ........... | H01M 8/0234 429/480 |
| 2017/0018785 | A1* | 1/2017 | Ohmori ............... | H01M 8/0276 |

FOREIGN PATENT DOCUMENTS

JP 2017-188346 A 10/2017

* cited by examiner

*Primary Examiner* — Olatunji A Godo
(74) *Attorney, Agent, or Firm* — Hunton Andrews Kurth LLP

(57) ABSTRACT

Provided are a fuel cell and a method for manufacturing the fuel cell capable of enhancing the joining (joint strength) with a resin sheet and contributing to reduction in the material cost and the product cost. A GDL (e.g., An-GDL) has a protrusion protruding to the outside of a MEA, and the resin sheet is bonded with the GDL at the protrusion of the GDL via the adhesive layer on the outside of the MEA.

13 Claims, 8 Drawing Sheets

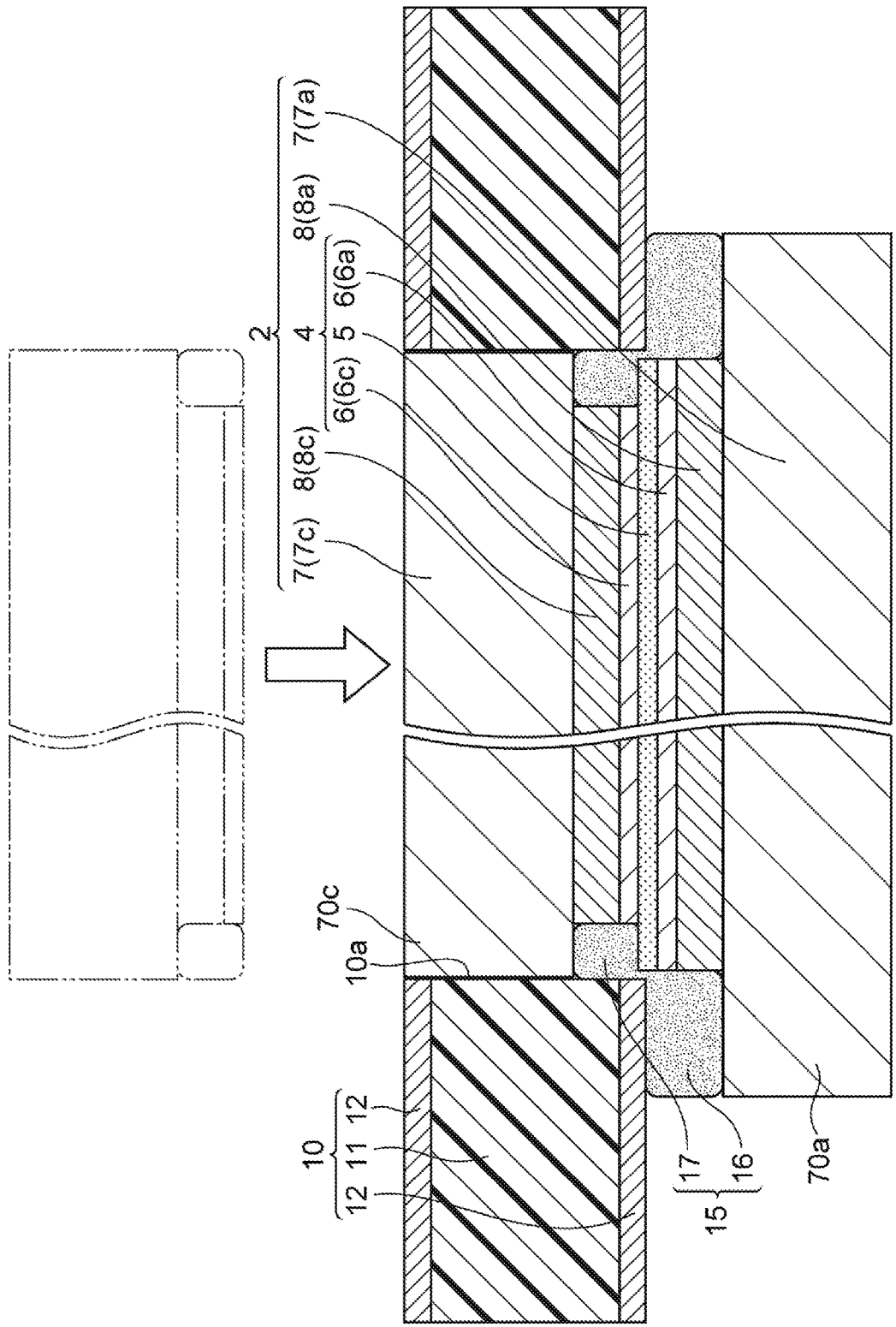

FUEL CELL AND METHOD FOR MANUFACTURING THE FUEL CELL

CROSS REFERENCE TO RELATED APPLICATIONS

The present application claims priority from Japanese patent application JP 2019-037618 filed on Mar. 1, 2019, the content of which is hereby incorporated by reference into this application.

BACKGROUND

Technical Field

The present disclosure relates to a fuel cell and a method for manufacturing the fuel cell.

Background Art

A fuel cell unit (this may be called a fuel cell stack) typically has a stack structure including the lamination of a plurality of fuel cells (they may be called single cells, and hereinafter they may be simply called cells). Each fuel cell includes a membrane electrode assembly (MEA) made up of an ion-permeable electrolyte membrane, and an anode catalyst layer (electrode catalyst layer) and a cathode catalyst layer (electrode catalyst layer) that sandwich the electrolyte membrane therebetween. Each fuel cell has a gas diffusion layer (GDL) on either side of the MEA, and the gas diffusion layers transmit fuel gas or oxidant gas, and collect electric current generated through an electrochemical reaction. The membrane electrode assembly having the GDL disposed on either side is called a membrane electrode & gas diffusion layer assembly (MEGA), and a pair of separators sandwiches the MEGA. Each separator has a corrugated shape or has ridges and furrows formed by press working, for example, and has a flow channel to supply fuel gas to the anode catalyst layer (electrode catalyst layer) and a flow channel to supply oxidant gas to the cathode catalyst layer (electrode catalyst layer). Some fuel cells have a resin microporous layer (MPL) between the MEA and each GDL.

Such a fuel cell having a frame-like resin sheet (this may be called a resin frame or a resin case) at the outer edge (on the outer periphery) of the MEGA also is known.

JP 2017-188346 A, for example, discloses a MEGA with a resin frame member (resin sheet). This MEGA includes: a membrane electrode assembly having an electrolyte membrane and an electrode catalyst layer formed on either face of the electrolyte membrane; a frame-shaped adhesive layer on the outer periphery of one face of the membrane electrode assembly; a frame-shaped resin frame member (resin sheet) stacked so that the inner periphery of the resin frame member is in contact with the outer periphery of the adhesive layer; and a gas diffusion layer disposed inside of the inner periphery of the resin frame member, the gas diffusion layer being stacked so that the outer periphery of the gas diffusion layer is in contact with the inner periphery of the adhesive layer. The gas diffusion layer has a frame-shaped resin microporous layer on the outer periphery of the gas diffusion layer, and the microporous layer is in contact with the inner periphery of the adhesive layer and the inner edge of the microporous layer extends to project inward from the inner edge of the adhesive layer.

The fuel cell described in JP 2017-188346 A is configured so that the microporous layer extends inward from the outer edge of the gas diffusion layer to project inward from the inner end of the adhesive layer. This configuration therefore improves the strength of the gas diffusion layer against the stress from a pressure that presses the gas diffusion layer to the adhesive layer, and so suppresses deformation, such as folding and bending, of the gas diffusion layer stacked on the adhesive layer.

SUMMARY

As described in JP 2017-188346 A, for example, a MEGA having a resin sheet on the periphery is typically manufactured by stacking an anode GDL (An-GDL), an anode MPL (An-MPL), an anode electrode catalyst layer, an electrolyte membrane, and a cathode electrode catalyst layer (or an anode GDL (An-GDL), an anode MPL (An-MPL), an anode electrode catalyst layer, an electrolyte membrane, an cathode electrode catalyst layer, and a cathode MPL (Ca-MPL)), which have the same dimensions, applying adhesive (e.g., ultraviolet (UV) curable adhesive) on the cathode electrode catalyst layer as the uppermost layer to form an adhesive layer, and joining the resin sheet and the cathode GDL (Ca-GDL) with the MEA via the adhesive layer (see FIG. 7A). Alternatively such a MEGA is manufactured by stacking an anode GDL (An-GDL), an anode MPL (An-MPL), an anode electrode catalyst layer and an electrolyte membrane, each having the same dimension, (i.e., a cathode electrode catalyst layer is not formed on the outer edge of the electrolyte membrane), applying adhesive (e.g., ultraviolet (UV) curable resin) on the electrolyte membrane as the uppermost layer to form an adhesive layer, and joining the resin sheet with the MEA via the adhesive layer (See FIG. 7B).

Such a conventional technique described in JP 2017-188346 A has the following problems to be solved.

The inside of each fuel cell repeats wetting and drying during the power generation, and so generates distortion at the electrolyte membrane. The electrolyte membrane suppresses its dimension change due to its own reinforcing layer and the joint strength with the electrode catalyst layer, the MPL, and the GDL. Accumulation of such distortion, however, may cause a failure of these joint strengths to suppress the dimension change of the electrolyte membrane. As a result, the distortion accumulated at the electrolyte membrane acts on the adhesive (adhesive layer) attached to the electrode catalyst layer and the electrolyte membrane as well, and may cause delamination from the resin sheet.

The electrode catalyst layer and the electrolyte membrane at a part where the adhesive (adhesive layer) is attached or the electrode catalyst layer and the MPL at a part under the adhesive (adhesive layer) do not contribute to power generation, and such a part is a factor of increasing the material cost and the product cost.

In view of the above problems, the present disclosure provides a fuel cell and a method for manufacturing the fuel cell capable of enhancing the joining (joint strength) with the resin sheet and also contributing to reduction in the material cost and the product cost.

To solve the above-stated problems, a fuel cell according to the present disclosure basically includes: a membrane electrode assembly including an electrolyte membrane and electrode catalyst layers on both faces of the electrolyte membrane; a first gas diffusion layer on one of the faces of the membrane electrode assembly, the first gas diffusion layer having a first protrusion protruding to the outside of the membrane electrode assembly; an adhesive layer disposed at the first protrusion on the outside of the membrane electrode assembly; and a resin sheet disposed for lamination to be in contact with the adhesive layer, the resin sheet bonding with the first gas diffusion layer via the adhesive layer.

In some embodiments, the resin sheet has an inner end that is located outside of the outer end of the membrane electrode assembly, and at least an inner periphery of the resin sheet is in contact with the adhesive layer.

In some embodiments, the fuel cell further includes a second gas diffusion layer on the other face of the membrane electrode assembly and disposed inside of the resin sheet.

In some embodiments, the second gas diffusion layer has a second protrusion protruding to the outside of the membrane electrode assembly, and the adhesive layer is disposed also at the second protrusion on the outside of the membrane electrode assembly.

In some embodiments, the electrode catalyst layer on one of the faces of the electrolyte membrane close to the second gas diffusion layer has an outer end located inside of outer ends of the electrolyte membrane and of the second gas diffusion layer, and the adhesive layer is in contact with the electrolyte membrane and the second gas diffusion layer for bonding of the electrolyte membrane and the second gas diffusion layer.

In some embodiments, the fuel cell further includes a microporous layer at least one of between the membrane electrode assembly and the first gas diffusion layer or between the membrane electrode assembly and the second gas diffusion layer.

In some embodiments, the first gas diffusion layer disposed on the one face of the membrane electrode assembly is an anode gas diffusion layer, and the second gas diffusion layer disposed on the other face of the membrane electrode assembly is a cathode gas diffusion layer.

In some embodiments, the adhesive layer includes hot-melt adhesive.

Specifically in some embodiments of the present disclosure, a fuel cell includes: a membrane electrode assembly including an electrolyte membrane and electrode catalyst layers on both faces of the electrolyte membrane; an anode gas diffusion layer on one of the faces of the membrane electrode assembly, the anode gas diffusion layer having a protrusion protruding to the outside of the membrane electrode assembly; a cathode gas diffusion layer on the other face of the membrane electrode assembly; an adhesive layer disposed at least at the protrusion on the outside of the membrane electrode assembly; and a resin sheet disposed for lamination on the outside of the cathode gas diffusion layer to be in contact with the adhesive layer, the resin sheet bonding with the anode gas diffusion layer via the adhesive layer.

In some embodiments, the fuel cell further includes a microporous layer between the membrane electrode assembly and the anode gas diffusion layer, and a microporous layer between the membrane electrode assembly and the cathode gas diffusion layer.

A method for manufacturing a fuel cell according to the present disclosure manufactures a fuel cell including: a membrane electrode assembly including an electrolyte membrane and first and second electrode catalyst layers on both faces of the electrolyte membrane; and a resin sheet holding the membrane electrode assembly. The method at least includes: forming the first electrode catalyst layer on a first gas diffusion layer so as to expose an outer peripheral part of the first gas diffusion layer; stacking the electrolyte membrane on the first electrode catalyst layer for lamination; applying adhesive on the exposed outer peripheral part of the first gas diffusion layer to form a first adhesive layer; and stacking a resin sheet to be in contact with the adhesive layer for lamination so that the first gas diffusion layer and the resin sheet bond via the first adhesive layer.

In some embodiments, the method for manufacturing the fuel cell further includes: applying the second electrode catalyst layer on a second gas diffusion layer so as to expose an outer peripheral part of the second gas diffusion layer; applying adhesive on the exposed outer peripheral part of the second gas diffusion layer to form a second adhesive layer; and disposing the second electrode catalyst layer on the electrolyte membrane on the opposite side of the first electrode catalyst layer for joining so that the resin sheet is located outside of the second gas diffusion layer.

Specifically in some embodiments, a method for manufacturing a fuel cell manufactures a fuel cell including: a membrane electrode assembly including an electrolyte membrane and an anode electrode catalyst layer and a cathode electrode catalyst layer on both faces of the electrolyte membrane; and a resin sheet holding the membrane electrode assembly. The method includes: applying the anode electrode catalyst layer on an anode gas diffusion layer, the anode electrode catalyst layer being smaller than the anode gas diffusion layer, so as to expose an outer peripheral part of the anode gas diffusion layer; stacking the electrolyte membrane for lamination on the anode electrode catalyst layer; applying adhesive on the outer peripheral part of the anode gas diffusion layer to form a first adhesive layer; stacking a resin sheet for lamination to be in contact with the first adhesive layer to bond the anode gas diffusion layer and the resin sheet via the first adhesive layer; applying the cathode electrode catalyst layer on a cathode gas diffusion layer, the cathode electrode catalyst layer being smaller than the cathode gas diffusion layer, so as to expose an outer peripheral part of the cathode gas diffusion layer; applying adhesive on the outer peripheral part of the cathode gas diffusion layer to form a second adhesive layer; and disposing the cathode electrode catalyst layer on the electrolyte membrane on the opposite side of the anode electrode catalyst layer for joining so that the resin sheet is located outside of the cathode gas diffusion layer.

The fuel cell according to the present disclosure includes the gas diffusion layer (e.g., the anode gas diffusion layer) having a protrusion protruding to the outside of the membrane electrode assembly, and the resin sheet bonding with the gas diffusion layer via the adhesive layer disposed at the protrusion of the gas diffusion layer and outside of the membrane electrode assembly. In this way the fuel cell directly connects the resin sheet and the gas diffusion layer with the adhesive layer (without the membrane electrode assembly intervening therebetween) and so improves the joining (joint strength) of the resin sheet, and reduces the electrode catalyst layer and the electrolyte membrane that do not contribute to power generation and so reduces the material cost and the product cost.

BRIEF DESCRIPTION OF THE DRAWINGS

FIG. 6 is a cross-sectional view schematically showing the electrode component joining step (S9) in FIG. 3; FIG. 7A shows an example of the adhesive applied on the electrode catalyst layer of the MEA, and FIG. 7B shows an example of the adhesive applied on the electrolyte membrane of the MEA.

DETAILED DESCRIPTION

Figure 1:
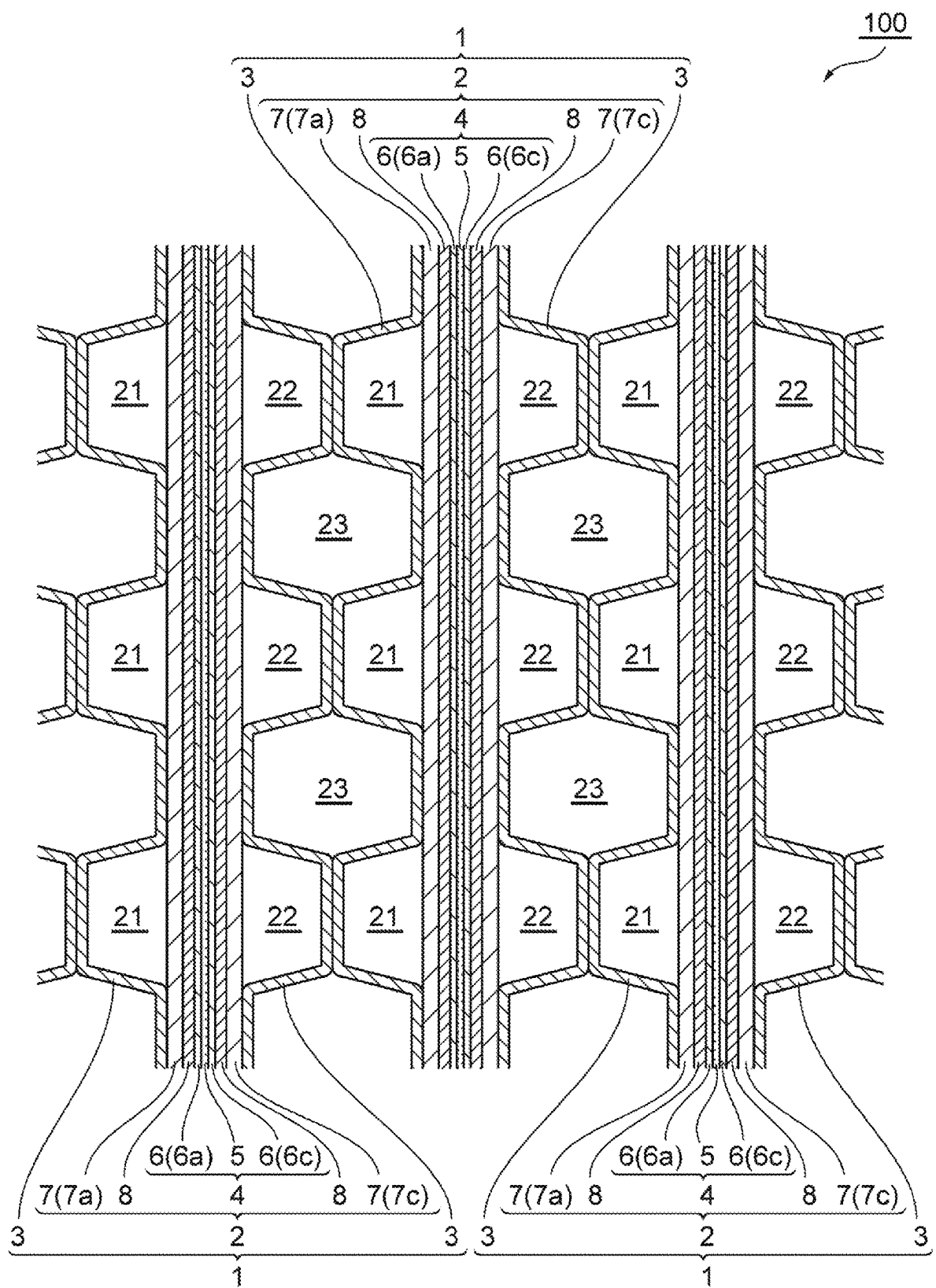
FIG. 1 is a cross-sectional view of a typical part of a fuel cell unit (fuel cell stack)

The following describes the configuration of the present disclosure in details, by way of one example shown in the drawings. The following describes one application example that is a fuel cell to be mounted in a fuel cell vehicle and a fuel cell system including such a fuel cell, and the scope of application of the present disclosure is not limited to such an example.

[Configuration of Fuel Cell Unit (Fuel Cell Stack)]

FIG. 1 is a cross-sectional view of a typical part of a fuel cell unit (fuel cell stack) 100. As shown in FIG. 1, the fuel cell unit 100 includes the lamination of a plurality of individual cells (single cells) 1 as the base units. Each cell 1 is a polymer electrolyte fuel cell that generates electrical power through an electrochemical reaction between oxidation gas (e.g., air) and fuel gas (e.g., hydrogen). The cell 1 includes a membrane electrode & gas diffusion layer assembly (MEGA) 2 and separators 3 that are in contact with the MEGA 2 as a partition of adjacent MEGAs 2. In the present embodiment, the MEGA 2 is disposed between a pair of separators 3 and 3.

The MEGA 2 includes a membrane electrode assembly (MEA) 4 integrated with the gas diffusion layers (GDLs) 7 and 7 disposed on both sides of the MEA 4. The MEA 4 includes an electrolyte membrane 5 and a pair of electrode catalyst layers 6 and 6 that are joined with the electrolyte membrane 5 so as to sandwich the electrolyte membrane 5 therebetween. The electrolyte membrane 5 includes a proton-conductive ion-exchange membrane made of solid polymer. The electrode catalyst layers 6 are made of a porous carbon material loaded with catalyst, such as platinum or platinum alloy. The electrode catalyst layer 6 disposed on one side (face) of the electrolyte membrane 5 serves as an anode (hereinafter called an anode electrode catalyst layer 6a) and the electrode 6 on the other side (face) serves as a cathode (hereinafter called a cathode electrode catalyst layer 6c). The GDLs 7 are made of a conductive material having gas permeability, including a carbon porous body, such as carbon paper or carbon cloth, or a metal porous body, such as metal mesh or foam metal.

The cell 1 of the present embodiment includes a pair of microporous layers (MPLs) 8, 8 between the MEA 4 (the electrode catalyst layers 6, 6 thereof) and the gas diffusion layers 7, 7. These MPLs 8 are made of resin that is a microporous material having micro-pores having a size smaller than the holes of the GDLs 7. These MPLs 8 may be omitted.

In the present embodiment, the MEGA 2 serves as a power-generation part of the fuel cell unit 100, and the separators 3 are in contact with the GDL7s of the MEGA 2.

Each of the separators 3 is a plate member made of metal that is excellent in conductivity and gas imperviousness (e.g., metals such as SUS, titanium, aluminum, copper, and nickel) as a base material, and is in contact with the GDL 7 of the MEGA 2 on one face and with a face of another adjacent separator 3 on the other face.

Each separator 3 in the present embodiment has a corrugated shape or has ridges and furrows in cross section. Specifically each wave shape of the corrugated pattern in the separator 3 is an isosceles trapezoid. The isosceles trapezoid has a substantially flat top whose angles of both ends are equal, and the both ends are angular. That is, the shape of these separators 3 is substantially the same viewed from its surface side and from its rear-face side. One of the GDLs 7 of the MEGA 2 is in planar contact with the tops of one of the separators 3, and the other GDL 7 of the MEGA 2 is in planar contact with the tops of the other separator 3.

The GDL 7 (hereinafter called an anode gas diffusion layer (An-GDL) 7a) on one of the electrode catalyst layer 6 (anode electrode catalyst layer 6a) and the corresponding separator 3 define a gas flow channel 21 to flow fuel gas. The GDL 7 (hereinafter called a cathode gas diffusion layer (Ca-GDL) 7c) on the other electrode catalyst layer 6 (cathode electrode catalyst layer 6c) and the corresponding separator 3 define a gas flow channel 22 to flow oxidant gas. When fuel gas and oxidant gas are supplied to the gas flow channel 21 and the gas flow channel 22 that are opposed via the cell 1, they cause an electrochemical reaction in the cell 1 to generate electrical power.

A cell 1 and an adjacent cell 1 are disposed so that their anode electrode catalyst layer 6 and cathode electrode catalyst layer 6 are opposed. Tops of the separator 3 along the electrode catalyst layer 6 as the anode of one cell 1 and tops of the separator 3 along the electrode catalyst layer 6 as the cathode of another adjacent cell 1 are in planar contact on their rear faces. These separators 3 and 3 of the adjacent two cells 1 that are in planar contact define spaces 23, and water as refrigerant to cool the cells 1 flow through the spaces 23.

Figure 2:
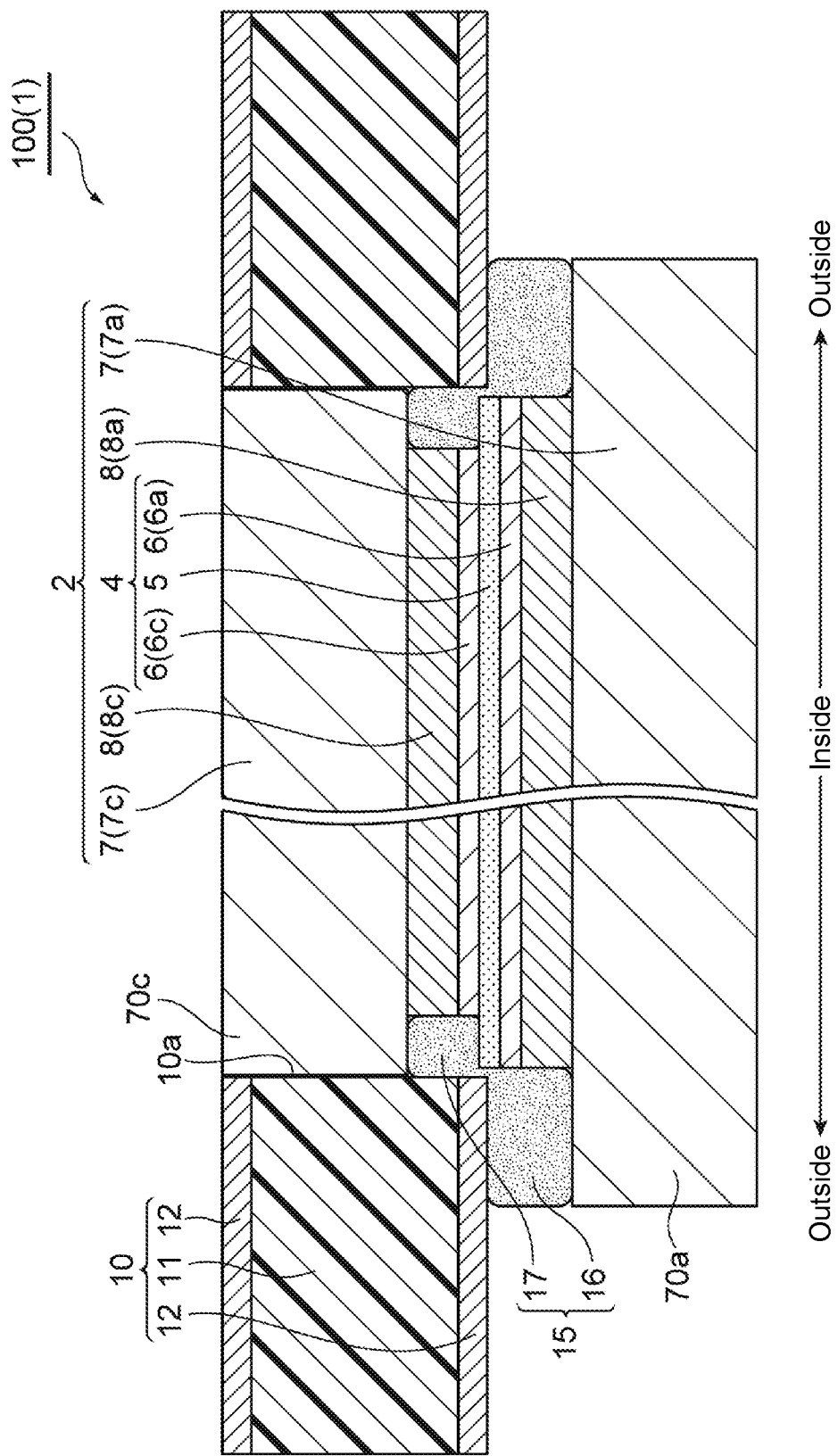
FIG. 2 is an enlarged cross-sectional view of the periphery of a fuel cell.

FIG. 2 is a cross-sectional view of the periphery that is a major part of the fuel cell unit 100 (the fuel cell 1 thereof). FIG. 2 omits the separators. As shown in FIG. 2, each cell 1 making up the fuel cell unit 100 as stated above is integral with a frame-shaped resin sheet 10 at the outer edge (on the periphery) of the MEGA 2. In other words, the MEGA 2 of the present embodiment is configured so that the inner periphery of the frame-shaped resin sheet 10 is bonded to the outer periphery of one face of the MEGA 2 via an adhesive layer 15. These MEGA 2 and resin sheet 10 are disposed between a pair of separators not shown in FIG. 2.

More specifically the MEGA 2 has a substantially rectangular shape, for example. A rectangular An-GDL 7a is disposed on the anode-side face (the lower face of FIG. 2) of the MEA 4 (via an anode microporous layer (An-MPL) 8a), and a rectangular Ca-GDL 7c is disposed on the cathode-side face (the upper face of FIG. 2) of the MEA 4 (via a cathode microporous layer (Ca-MPL) 8c). The MEA 4 includes the rectangular anode electrode catalyst layer 6a on the anode-side face of the rectangular electrolyte membrane 5, and the rectangular cathode electrode catalyst layer 6c on the cathode-side face of the electrolyte membrane 5.

The anode electrode catalyst layer 6a in the present embodiment has a rectangular shape that is equal in size to the electrolyte membrane 5 in plan view (viewed in the stacking direction). The cathode electrode catalyst layer 6c has a rectangular shape that is smaller than the electrolyte membrane 5 in plan view, so that the electrolyte membrane 5 (the cathode-side face thereof) does not have the cathode electrode catalyst layer 6c formed on the outer periphery and is exposed at the part without the cathode electrode catalyst layer 6c. Instead, this outer periphery of the electrolyte membrane 5 (the cathode-side face thereof) is in contact with the adhesive layer 15 described later.

Figure 7A:
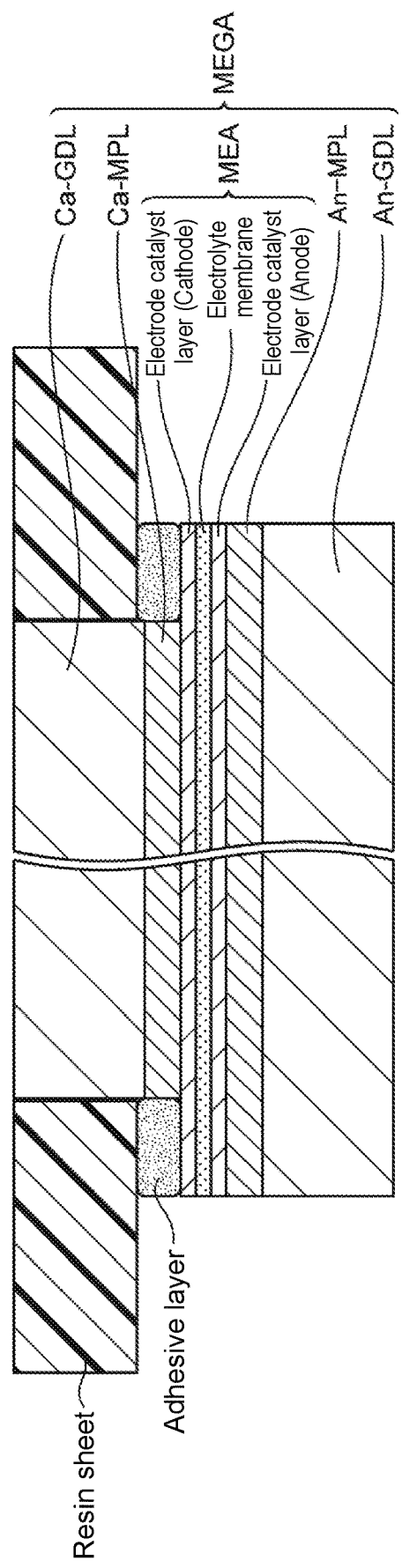
FIGS. 7A and 7B are enlarged cross-sectional views of the periphery of a fuel cell by conventional techniques.
Figure 7B:
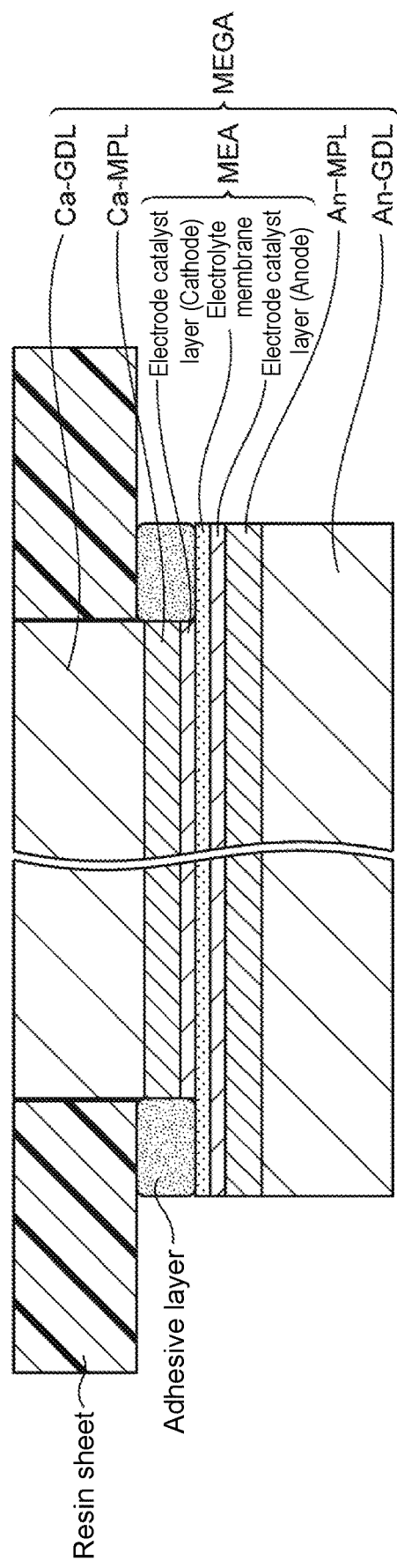

In another embodiment, the cathode electrode catalyst layer 6c may have a rectangular shape that is equal in size to the electrolyte membrane 5, so as to stack the anode electrode catalyst layer 6a, the electrolyte membrane 5, and the cathode electrode catalyst layer 6c having the same dimension (see FIG. 7A).

The An-GDL 7a has a rectangular shape that is larger than the MEA 4 in plan view. This means that the An-GDL 7a has a protrusion 70a protruding outward (on the outside) of the MEA 4 when it is disposed on the anode-side face (the lower face of FIG. 2) of the MEA 4. The Ca-GDL 7c has a rectangular shape that is larger than or equal to the MEA 4 (the electrolyte membrane 5 thereof) and that is smaller than the An-GDL 7a in plan view. This means that the Ca-GDL 7c has a protrusion 70c protruding outward (on the outside) of the cathode electrode catalyst layer 6c of the MEA 4 (and the Ca-MPL 8c that is the upper layer of the cathode electrode catalyst layer 6c). In this way, in the cross section shown in FIG. 2, the outer periphery of the MEGA 2 has a stepped shape such that the An-GDL 7a (protrusion 70a thereof) and the Ca-GDL 7c (protrusion 70c thereof) on both faces of the MEA 4 protrude outward and the MEA 4 at the center is recessed inward.

The resin sheet 10 that holds the MEGA 2 (MEA 4 thereof) at the outer edge (on the periphery) of the MEGA 2 has a rectangular frame-shape so that an inner opening (i.e., the inner peripheral end) 10a of the resin sheet 10 is smaller than the An-GDL 7a (the outer peripheral end thereof) and is equal to or slightly larger than the Ca-GDL 7c (the outer peripheral end thereof). Such a resin sheet 10 is therefore disposed on the outside (circumference) of the Ca-GDL 7c (i.e., the resin sheet 10 surrounds the Ca-GDL 7c) from the cathode-side (the above of FIG. 2) of the MEA 4 so that the inner periphery of the resin sheet 10 overlaps with the outer periphery of the An-GDL 7a.

The adhesive layer 15 in this embodiment, which bonds the resin sheet 10 for fixing with the MEGA 2, is formed at a region defined with the stepped outer periphery of the MEGA 2 as stated above, i.e., with the protrusion 70a of the An-GDL 7a, the protrusion 70c of the Ca-GDL 7c, and the outer peripheral end of the MEA 4 (and the An-MPL 8a and the Ca-MPL 8c on both faces of the MEA 4). In other words, the adhesive layer 15 is formed on the protrusion 70a of the An-GDL 7a on the outside of the MEA 4 (and the An-MPL 8a) (i.e., the frame-like part between the outer peripheral end of the MEA 4 and the outer peripheral end of the An-GDL 7a (the entire face in the illustrated example)) and on the protrusion 70c of the Ca-GDL 7c on the outside of the MEA 4 (and the Ca-MPL 8c) (i.e., the frame-like part between the outer peripheral end of the MEA 4 and the outer peripheral end of the Ca-GDL 7c (the entire face in the illustrated example)). The anode-side part of the adhesive layer 15, i.e., the part on the protrusion 70a of the An-GDL 7a on the outside of the MEA 4 (and the An-MPL 8a) (hereinafter this part may be called an anode adhesive layer part 16) is a part mainly disposed between the outer periphery (protrusion 70a) of the An-GDL 7a and the inner periphery of the resin sheet 10 for bonding of these parts. The cathode-side part of the adhesive layer 15, i.e., the part on the protrusion 70c of the Ca-GDL 7c on the outside of the MEA 4 (and the Ca-MPL 8b) (hereinafter this part may be called a cathode adhesive layer part 17) is a part mainly disposed between the outer periphery (protrusion 70c) of the Ca-GDL 7c and the outer periphery of the electrolyte membrane 5 (the cathode-side face thereof) of the MEA 4 for bonding of these parts.

With this configuration, the resin sheet 10 is stacked so that the inner periphery of the resin sheet 10 is in contact with the anode adhesive layer part 16 as the outer periphery of the adhesive layer 15 to be bonded at the outer periphery (protrusion 70a) of the An-GDL 7a. The Ca-GDL 7c is stacked so that the outer periphery of the Ca-GDL 7c is in contact with the cathode adhesive layer part 17 as the inner periphery of the adhesive layer 15 to be bonded at the outer periphery of the electrolyte membrane 5 (the cathode-side face thereof) of the MEA 4. A gap between the MEA4 (the electrolyte membrane 5 thereof) and the resin sheet 10 also is filled with the adhesive layer 15 (the adhesive thereof), so that the anode adhesive layer part 16 on the inner periphery and the cathode adhesive layer part 17 on the outer periphery of the adhesive layer 15 are integral via such a filled gap between the MEA 4 (the electrolyte membrane 5 thereof) and the resin sheet 10.

The resin sheet 10 of the present embodiment includes a rectangular frame member 11 made of resin and bonding layers 12 and 12 disposed on both faces of the frame member 11, and such a resin sheet 10 is bonded to the separators via these bonding layers 12 and 12 on both faces. Such a resin sheet 10 including the frame member 11 having the bonding layers 12 and 12 on both faces may be called a three-layered resin sheet or a three-layered sheet.

The frame member 11 of the resin sheet 10 may be made of: thermoplastic resins, such as polypropylene (PP), phenol resin, epoxy resin, polyethylene (PE), polyethylene terephthalate (PET); a resin member including the lamination of a plurality of resins, such as a three-layered resin member including polyethylene naphthalate (PEN) having PP on the both faces; or thermosetting resins. The bonding layers 12 of the resin sheet 10 may include adhesive that is thermoplastic resin having adhesiveness, such as vinyl acetate resins, polyvinyl alcohol resins, ethylene vinyl acetate resins, vinyl chloride resins, acrylic resins, polyamide resins, cellulosic resins, polyvinylpyrrolidone resins, polystyrene resins, cyanoacrylate resins, and polyvinyl acetal resins.

The adhesive for the adhesive layer 15 may be known adhesives, including ultraviolet (UV) curable resins including radical polymerization resins, such as polyisobutylene resins, epoxy resins, and acrylic resins, and hot-melt adhesive including thermoplastic resin. From the viewpoint of the power-generation function, specifically platinum-catalyst poisoning, the adhesive of the adhesive layer 15 in some embodiments is hot-melt adhesive. Such adhesive of the adhesive layer 15 can be applied on the An-GDL 7a (the protrusion 70a thereof) and on the Ca-GDL 7c (the protrusion 70c thereof) by screen printing with a dispenser, for example.

In this way, the cell 1 having the MEGA 2 with the resin sheet 10 of the present embodiment is mainly manufactured by applying/stacking (for lamination) the An-MPL 8a, the anode electrode catalyst layer 6a, and the electrolyte membrane 5, which are smaller than the An-GDL 7a, applying adhesive (e.g., hot-melt adhesive) around the lamination to form the adhesive layer 15 (the anode adhesive layer part 16 thereof), and stacking (for lamination) the resin sheet 10 on the adhesive layer 15 (anode adhesive layer part 16 thereof) to directly connect the An-GDL 7a and the resin sheet 10 with the adhesive layer 15, i.e., to directly fill the gap between the An-GDL 7a and the resin sheet 10 with the adhesive layer 15.

Although not shown in the drawing, a stack-structured fuel cell unit (fuel cell stack) 100 can be manufactured by stacking a plurality of these cells 1 each having the MEGA 2 with the resin sheet 10 as stated above to be a lamination of the cells, and disposing a terminal, an insulator and an endplate on both ends in the cell-stacking direction, followed by clamping (pressurizing) and fixing in the cell-stacking direction.

[Manufacturing Steps of Fuel Cell]

Figure 3:
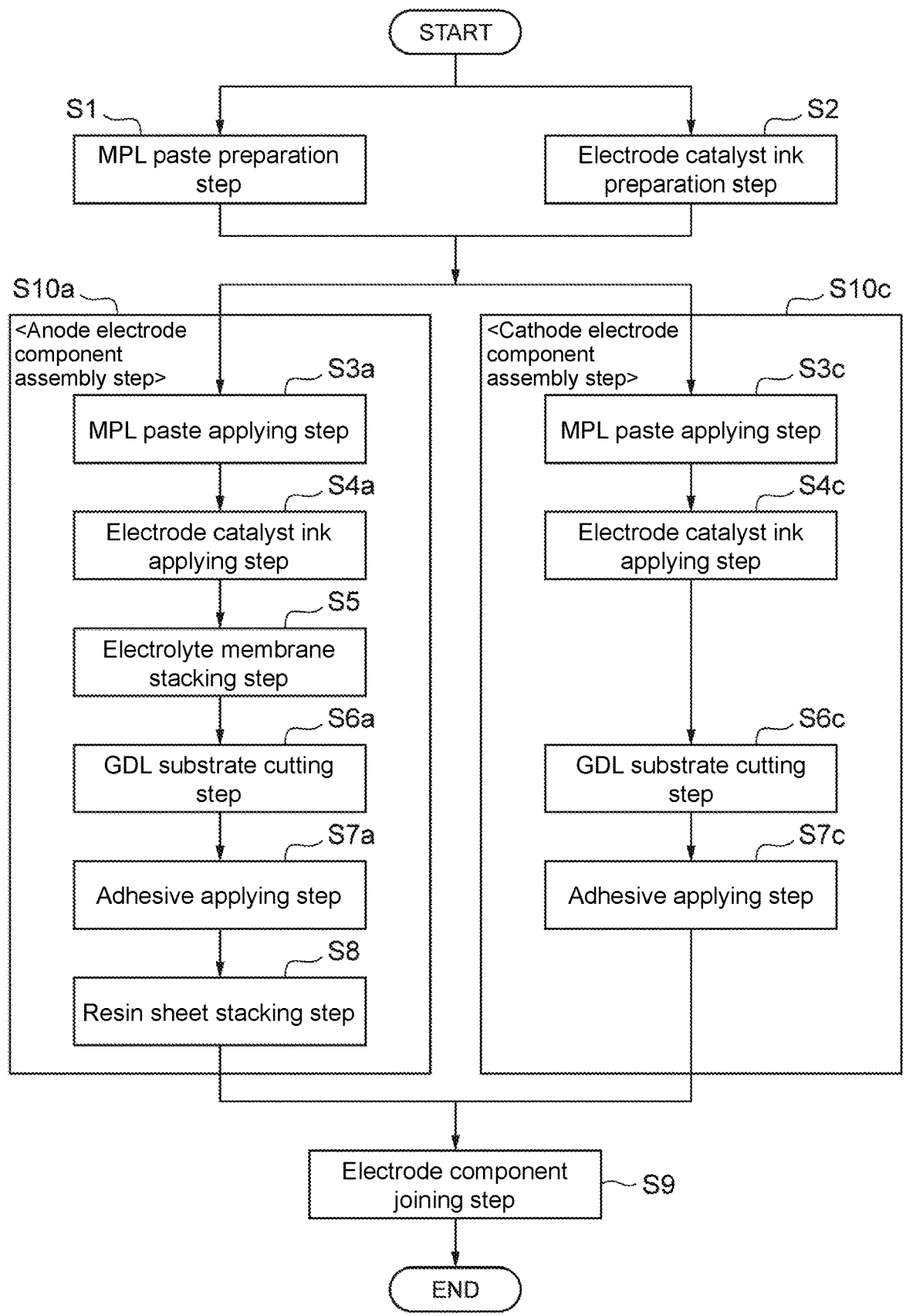
FIG. 3 is a flowchart of one example of the manufacturing process of a fuel cell.
Figure 4:
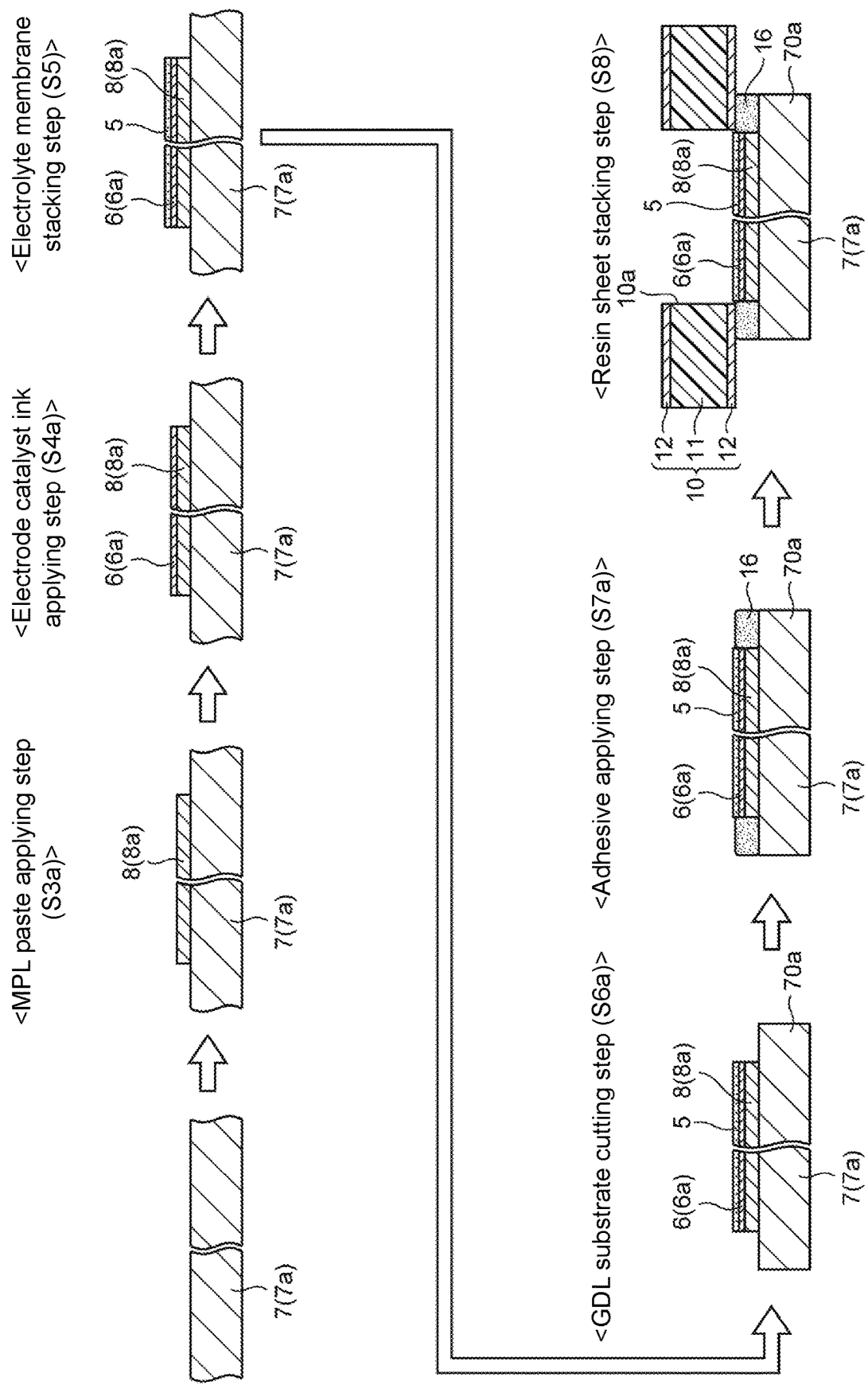
FIG. 4 is a cross-sectional view schematically showing the anode electrode component assembly step (S10a) in FIG. 3.
Figure 5:
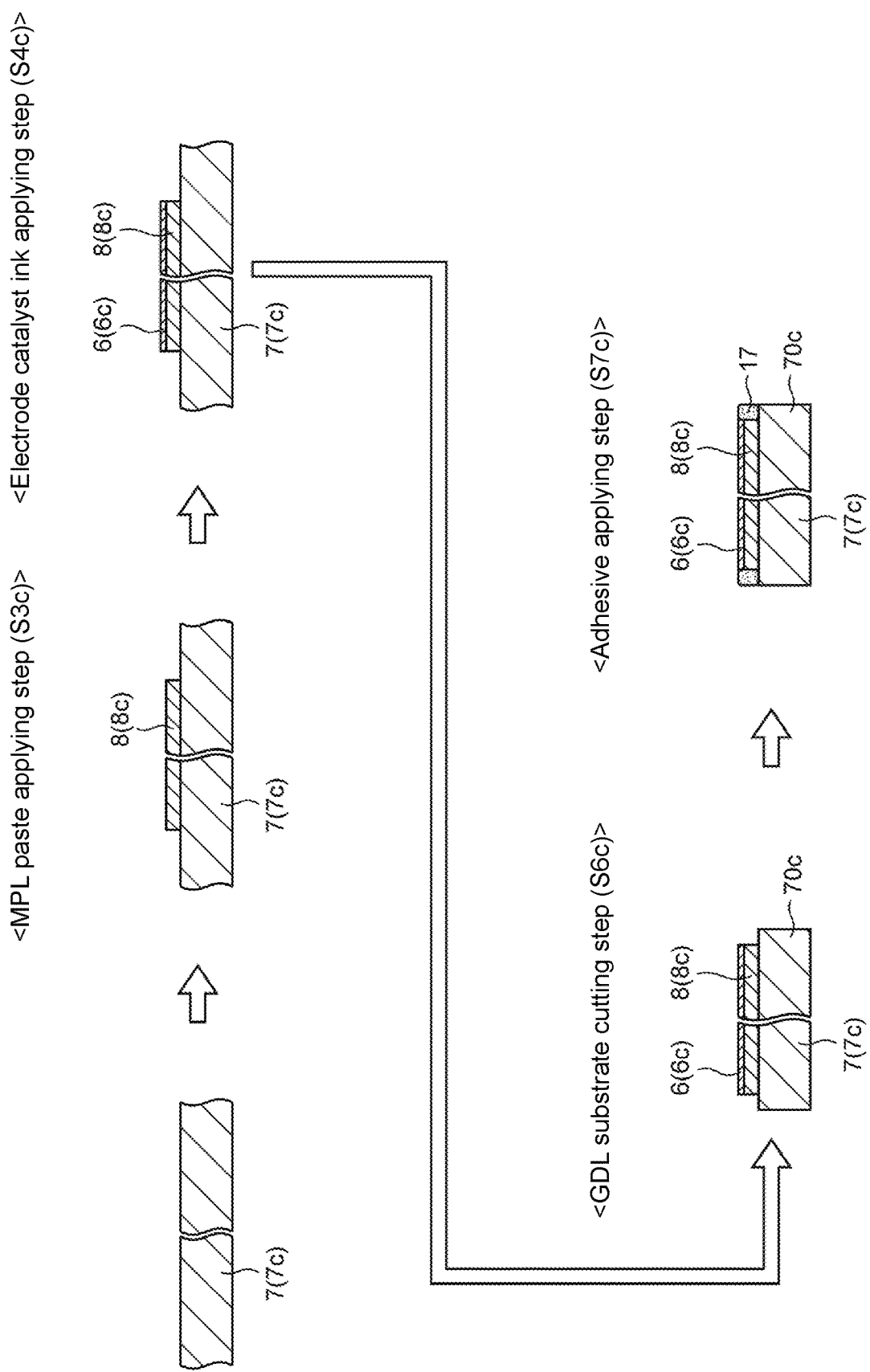
FIG. 5 is a cross-sectional view schematically showing the cathode electrode component assembly step (S10c) in FIG. 3.

Next the following describes a method for manufacturing the cell 1 of the fuel cell unit 100. FIG. 3 is a flowchart of one example of the manufacturing process of the fuel cell. FIG. 4 to FIG. 6 schematically show an anode electrode component assembly step (S10a), a cathode electrode component assembly step (S10c) and an electrode component joining step (S9) in the manufacturing process of the fuel cell.

As shown in FIG. 3, the manufacturing process of the cell 1 mainly includes: a MPL paste preparation step (S1); an electrode catalyst ink preparation step (S2); the anode electrode component assembly step (S10a) to assemble anode components beforehand; the cathode electrode component assembly step (S10c) to assemble cathode components beforehand; and the electrode component joining step (S9) to join the components of the anode prepared at S10a and the components of the cathode prepared at S10c.

Firstly the MPL paste preparation step (S1) and the electrode catalyst ink preparation step (S2) prepare MPL paste and electrode catalyst ink used at the anode electrode component assembly step (S10a) and the cathode component electrode assembly step (S10c).

The MPL paste preparation step (S1) mixes a conductive material, a binder, a dispersant, and a solvent, for example, for dispersion to prepare a paste. Examples of the conductive material include carbon, such as carbon black. Examples of the binder include fluorine polymeric materials, such as polytetrafluoroethylene (PTFE), and resin materials, such as polypropylene and polyethylene. The solvent is not limited especially, which may be various liquids, such as water, methanol, and ethanol. Surfactant used as the dispersant also is not limited especially, which may be various surfactants, including various types of non-ionic surfactants, such as ester type, ether types, and ester/ether types.

In a specific example, carbon, PTFE dispersion, water, surfactant, and thickener are dispersed with a planetary mixer, followed by filtration and defoaming to have a paste. The paste (e.g., with shearing stress 60 Pa at 562 s-1) is then conveyed to MPL paste applying steps (S3a, S3c).

The electrode catalyst ink preparation step (S2) prepares ink containing a catalyst-loaded carbon loaded with a catalyst, such as platinum or platinum alloy.

In a specific example, platinum-loaded carbon, ionomer solution, water, and alcohol are dispersed with an ultrasonic homogenizer and mixed with LEVIASTAR®, and are emulsified with FILMIX®, followed by filtration and defoaming to have ink. The ink (e.g., with shearing stress 40 Pa at 562 s-1) is then conveyed to electrode catalyst ink applying steps (S4a, S4c).

In the anode electrode component assembly step (S10a), the MPL paste applying step (S3a) applies the MPL paste prepared at S1 on the surface of the anode-side gas diffusion layer substrate (An-GDL substrate) (a long substrate for the An-GDL, for example) prepared beforehand to be in the rectangular pattern, and forms the An-MPL 8a (e.g., thickness: 40 µm, dimensions: 290 mm×390 mm, in-plane air permeability: 30 m$^3$/(Pa·sec)). This pattern can be applied by intermittent die-coating, for example. Instead of this pattern applying, continuously applied MPL paste may be cut to form the An-MPL 8a, and the cut An-MPL 8a may be placed on the An-GDL substrate for lamination.

Next the electrode catalyst ink applying step (S4a) applies the electrode catalyst ink prepared at S2 on the surface of the An-MPL 8a formed at S3a to be in the rectangular pattern of the same size as the An-MPL 8a, and so forms the anode electrode catalyst layer 6a (e.g., thickness: 5 µm, dimensions: 290 mm×390 mm). This pattern can be applied by intermittent die-coating, for example. Instead of this pattern applying, continuously applied electrode catalyst ink may be cut to form the anode electrode catalyst layer 6a, and the cut anode electrode catalyst layer 6a may be placed on the lamination of the An-MPL 8a and the An-GDL substrate.

Next the electrolyte membrane stacking step (S5) stacks for lamination (e.g., under thermal compression) the rectangular electrolyte membrane 5 on the surface of the anode electrode catalyst layer 6a formed at S4a. This rectangular electrolyte membrane 5 (e.g., thickness: 7 µm, dimensions: 290 mm×390 mm) is prepared by cutting from a long substrate beforehand, for example, and has the same size as the An-MPL 8a and the anode electrode catalyst layer 6a.

A GDL substrate cutting step (S6a) cuts the An-GDL substrate with the An-MPL 8a, the anode electrode catalyst layer 6a and the electrolyte membrane 5 stacked on the surface into a rectangular form having a size larger than the electrolyte membrane 5 and the like in plan view to form the An-GDL 7a (e.g., dimensions; 300 mm×400 mm). This forms the protrusion 70a (e.g., the frame-shaped part having inner dimensions: 290 mm×390 mm, outer dimensions: 300 mm×400 mm, and the width: 10 mm) as the exposed part on the outside of (around) the electrolyte membrane 5 and the like on the surface of the An-GDL 7a.

An adhesive applying step (S7a) applies adhesive on the outside of (around) the electrolyte membrane 5 and the like on the surface of the An-GDL 7a after cutting, i.e., on the protrusion 70a (on the entire face thereof) of the An-GDL 7a so that the adhesive has a frame-shape or a casing-shape, and forms the anode adhesive layer part 16 (e.g., thickness: 50 µm, width: 10 mm). This adhesive-application can be conducted by applying hot-melt adhesive on the surface of the An-GDL 7a with a dispenser scanned at a predetermined speed, for example.

A resin sheet stacking step (S8) stacks for lamination the rectangular frame-shaped resin sheet 10 (more specifically the sheet member including the resin frame member 11 having bonding layers 12 and 12 on both faces) (e.g., inner dimensions (dimensions of the inner opening 10a) 292 mm×392 mm) on the surface of the anode adhesive layer part 16 formed at S7a while positioning the inner periphery of the resin sheet 10 to be overlapped with a substantially uniform width for integration.

Through the steps S3a to S8 as stated above, the anode electrode component assembly step (S10a) to assemble the components of the anode ends.

In the cathode electrode component assembly step (S10c), similarly to the MPL paste applying step (S3a) as stated above, the MPL paste applying step (S3c) applies the MPL paste prepared at S1 on the surface of the cathode-side gas diffusion layer substrate (Ca-GDL substrate) (a long substrate for the Ca-GDL, for example) prepared beforehand to be in the rectangular pattern, and so forms the Ca-MPL 8c (e.g., thickness: 20 µm, dimensions: 286 mm×386 mm, in-plane air permeability: 50 m$^3$/(Pa·sec)). The Ca-MPL 8b has a rectangular shape that is smaller than the An-MPL 8a in plan view.

Next similarly to the electrode catalyst ink applying step (S4a), the electrode catalyst ink applying step (S4c) applies the electrode catalyst ink prepared at S2 on the surface of the Ca-MPL 8c formed at S3c to be in the rectangular pattern of the same size as the Ca-MPL 8c, and so forms the cathode electrode catalyst layer 6c (e.g., thickness: 10 µm, dimensions: 286 mm×386 mm).

Similarly to the GDL substrate cutting step (S6a) as stated above, a GDL substrate cutting step (S6c) cuts the Ca-GDL substrate with the Ca-MPL 8c and the cathode electrode catalyst layer 6c stacked on the surface into a rectangular form having a size larger than the cathode electrode catalyst layer 6c and the like in plan view to form the Ca-GDL 7c (e.g., dimensions; 292 mm×392 mm). In plan view, the Ca-GDL 7c has a rectangular shape that is smaller than the An-GDL 7a, is larger than the electrolyte membrane 5 and the like stacked on the An-GDL 7a, and is equal in size to the inner opening 10a of the resin sheet 10. This forms the protrusion 70c (e.g., the frame-shaped part having inner dimensions: 286 mm×386 mm, outer dimensions: 292 mm×392 mm, and the width: 6 mm) as the exposed part on the outside of (around) the cathode electrode catalyst layer 6c and the like on the surface of the Ca-GDL 7c.

Similarly to the adhesive applying step (S7a) as stated above, an adhesive applying step (S7c) applies adhesive (e.g., hot-melt adhesive) on the outside of (around) the cathode electrode catalyst layer 6c and the like on the surface of the Ca-GDL 7c after cutting, i.e., on the protrusion 70c (on the entire face thereof) of the Ca-GDL 7c so that the adhesive has a frame-shape or a casing-shape, and forms the cathode adhesive layer part 17 (e.g., thickness: 30 µm, width: 6 mm).

Through the steps S3c, S4c, S6c and S7c as stated above, the cathode electrode component assembly step (S10c) to assemble the components of the cathode ends.

After the anode electrode component assembly step (S10a) and the cathode electrode component assembly step (S10c), the electrode component joining step (S9) flips the components of the cathode after the cathode electrode component assembly step (S10c) vertically, for example, and places (internally) the Ca-GDL 7c inside of the resin sheet 10 (the inner opening 10a thereof) (i.e., so that the resin sheet 10 is located on the outside of the Ca-GDL 7c). The step then overlaps the electrolyte membrane 5 stacked on the An-GDL 7a and the cathode electrode catalyst layer 6c stacked on the Ca-GDL 7c (as well as (the inner periphery of) the anode adhesive layer part 16 applied and formed on the An-GDL 7a and (the outer periphery of) the cathode adhesive layer part 17 applied and formed on the Ca-GDL 7c), and presses (e.g., hot presses) them while adjusting the position of the An-GDL 7a and the Ca-GDL 7c in the stacking direction. At this time, the outer peripheral end of the cathode electrode catalyst layer 6c stacked on the Ca-GDL 7c is disposed inside of the outer peripheral ends of the electrolyte membrane 5 stacked on the An-GDL 7a and of the An-GDL 7a. This integrates the anode adhesive layer part 16 and the cathode adhesive layer part 17 to make up the adhesive layer 15, and joins both of the electrode components for integration.

Although not shown in the drawings, the MEGA 2 with the resin sheet 10 manufactured by the above-mentioned steps is sandwiched between a pair of separators 3 and 3, whereby the cell 1 as a component of the fuel cell unit 100 is manufactured.

Table 1 summarizes one example of physical properties of the MPL paste and the electrode catalyst ink as well as the thickness and the dimensions of the layers at the above-stated steps.

TABLE 1

| Steps | Physical properties of MPL paste and electrode catalyst ink/thicknesses and dimensions of the layers |
|---|---|
| MPL paste preparation step (S1) | shearing stress: 60 Pa at 562s−1 |
| Electrode catalyst ink preparation step (S2) | shearing stress: 40 Pa at 562s−1 |
| MPL paste applying step (anode) (S3a) | thickness: 40 µm, dimensions: 290 mm × 390 mm, in-plane air permeability: 30 m³/(Pa · sec) |
| MPL paste applying step (cathode) (S3c) | thickness: 20 µm, dimensions: 286 mm × 386 mm, in-plane air permeability: 50 m³/(Pa · sec) |
| Electrode catalyst ink applying step (anode) (S4a) | thickness: 5 µm, dimensions: 290 mm × 390 mm |
| Electrode catalyst ink applying step (cathode) (S4c) | thickness: 10 µm, dimensions: 286 mm × 386 mm |
| Electrolyte membrane stacking step (S5) | thickness: 7 µm, dimensions: 290 mm × 390 mm |
| GDL substrate cutting step (anode) (S6a) | dimensions; 300 mm × 400 mm |
| GDL substrate cutting step (cathode) (S6c) | dimensions; 292 mm × 392 mm |
| Adhesive applying step (anode) (S7a) | thickness: 50 µm, width: 10 mm |
| Adhesive applying step (cathode) (S7c) | thickness: 30 µm, width: 6 mm |
| Resin sheet stacking step (S8) | inner dimensions: 292 mm × 392 mm |
| Electrode component joining step (S9) | — |

In this way, the method for manufacturing the cell 1 having the MEGA 2 with the resin sheet 10 of the present embodiment mainly includes: applying/stacking (for lamination) the An-MPL 8a, the anode electrode catalyst layer 6a, and the electrolyte membrane 5, which are smaller than the An-GDL 7a; applying adhesive (e.g., hot-melt adhesive) around the lamination to form the adhesive layer 15 (the anode adhesive layer part 16 thereof), and stacking (for lamination) the resin sheet 10 on the adhesive layer 15 (the anode adhesive layer part 16 thereof) to directly connect the An-GDL 7a and the resin sheet 10 with the adhesive layer 15, i.e., to directly fill the gap between the An-GDL 7a and the resin sheet 10 with the adhesive layer 15.

As described above, in the present embodiment, the GDL 7 (e.g., the An-GDL 7a) has a protrusion protruding to the outside of the MEA 4, and the resin sheet 10 is bonded with the GDL 7 at the protrusion of the GDL 7 via the adhesive layer 15 on the outside of the MEA 4 so as to directly connect the resin sheet 10 and the GDL 7 via the adhesive layer 15 (without the MEA 4 intervening therebetween). This enhances the joining (joint strength) of the resin sheet 10 and reduces a part of the electrode catalyst layer 6 and the electrolyte membrane 5 that do not contribute to power generation, and so reduces the material cost and the product cost.

In the above embodiment, the adhesive layer 15 is formed all around the MEA 4, i.e., all around the MEA 4 (and the An-MPL 8a) at the protrusion 70a of the An-GDL 7a and all around the MEA 4 (and the Ca-MPL 8c) at the protrusion 70c of the Ca-GDL 7c. In another embodiment, the adhesive layer 15 may be formed only at a part (a part in the width direction) of the surface around the MEA 4.

The above-stated embodiment includes the adhesive layer 15 all around the MEA 4 (all circumferences of the MEA 4), and the resin sheet 10 is bonded to the An-GDL 7a (the protrusion 70a thereof) via such an adhesive layer 15. In another embodiment, the adhesive layer 15 may be formed only at a part around the MEA 4.

The above-stated embodiment is configured so that the resin sheet 10 is bonded to the An-GDL 7a (the protrusion 70a thereof). In another embodiment, the Ca-GDL 7c may be larger than the An-GDL 7a, and the resin sheet 10 may be bonded to the Ca-GDL 7c (the protrusion 70c thereof).

That is a detailed description of the embodiments of the present disclosure referring to the drawings. The specific configuration of the present disclosure is not limited to the above-stated embodiment, and the design may be modified variously without departing from the spirits of the present disclosure. The present disclosure covers such modified embodiments.

DESCRIPTION OF SYMBOLS

1 Fuel cell (cell)
2 Membrane electrode & gas diffusion layer assembly (MEGA)
3 Separator
4 Membrane electrode assembly (MEA)
5 Electrolyte membrane
6 Electrode catalyst layer
6a Anode electrode catalyst layer
6c Cathode electrode catalyst layer
7 Gas diffusion layer (GDL)
7a Anode gas diffusion layer (An-GDL)
7c Cathode gas diffusion layer (Ca-GDL)
8 Micro-porous layer (MPL)
8a Anode microporous layer (An-MPL)
8c Cathode microporous layer (Ca-MPL)
10 Resin sheet
10a Inner opening
11 Frame member
12 Bonding layer
15 Adhesive layer
16 Anode adhesive layer part
17 Cathode adhesive layer part
21, 22 Gas flow channel
23 Space to flow water
70a Protrusion of anode gas diffusion layer
70c Protrusion of cathode gas diffusion layer
100 Fuel cell unit (fuel cell stack)

What is claimed is:

1. A fuel cell comprising: a membrane electrode assembly including an electrolyte membrane and electrode catalyst layers on both faces of the electrolyte membrane;
    a first gas diffusion layer on one of the faces of the membrane electrode assembly;
    a microporous layer between the electrolyte membrane and the first gas diffusion layer;
    an adhesive layer disposed at the first protrusion on the outside of the membrane electrode assembly; and
    a resin sheet disposed for lamination to be in contact with the adhesive layer, the resin sheet bonding with the first gas diffusion layer via the adhesive layer,
    wherein the electrode catalyst layer on the first diffusion layer face side of the membrane electrode assembly and the microporous layer being smaller in width in plan view than the electrolyte membrane to form a step, and
    wherein the first gas diffusion layer being the same size or larger in width in plan view than the electrolyte membrane such that is has a first protrusion protruding to the outside of the electrolyte membrane and protruding to the outside of the electrode catalyst layer on the first diffusion layer face side of the electrolyte membrane and the microporous layer.

2. The fuel cell according to claim 1, wherein the resin sheet has an inner end that is located outside of the outer end of the membrane electrode assembly, and at least an inner periphery of the resin sheet is in contact with the adhesive layer.

3. The fuel cell according to claim 1, further comprising a second gas diffusion layer on the other face of the membrane electrode assembly and disposed inside of the resin sheet.

4. The fuel cell according to claim 3, wherein the second gas diffusion layer has a second protrusion protruding to the outside of the membrane electrode assembly, and
    the adhesive layer is disposed also at the second protrusion on the outside of the membrane electrode assembly.

5. The fuel cell according to claim 3, wherein the electrode catalyst layer on one of the faces of the electrolyte membrane close to the second gas diffusion layer has an outer end located inside of outer ends of the electrolyte membrane and of the second gas diffusion layer, and the adhesive layer is in contact with the electrolyte membrane and the second gas diffusion layer for bonding of the electrolyte membrane and the second gas diffusion layer.

6. The fuel cell according to claim 3, further comprising a microporous layer between the membrane electrode assembly and the second gas diffusion layer.

7. The fuel cell according to claim 3, wherein the first gas diffusion layer disposed on the one face of the membrane electrode assembly is an anode gas diffusion layer, and the second gas diffusion layer disposed on the other face of the membrane electrode assembly is a cathode gas diffusion layer.

8. The fuel cell according to claim 1, wherein the adhesive layer includes hot-melt adhesive.

9. A fuel cell comprising: a membrane electrode assembly including an electrolyte membrane and electrode catalyst layers on both faces of the electrolyte membrane;
    an anode gas diffusion layer on one of the faces of the membrane electrode assembly, the anode gas diffusion layer having a protrusion protruding to the outside of the membrane electrode assembly;
    a cathode gas diffusion layer on the other face of the membrane electrode assembly;
    a microporous layer between the electrolyte membrane and the cathode gas diffusion layer;
    an adhesive layer disposed at least at the protrusion on the outside of the membrane electrode assembly; and
    a resin sheet disposed for lamination on the outside of the cathode gas diffusion layer to be in contact with the adhesive layer, the resin sheet bonding with the anode gas diffusion layer via the adhesive layer,
    wherein the electrode catalyst layer on the cathode side of the membrane electrode assembly and the microporous layer being smaller in width in plan view than the electrolyte membrane to form a step, and
    wherein the cathode gas diffusion layer being the same size or larger in width in plan view than the electrolyte membrane such that it has a first protrusion protruding to the outside of the electrolyte membrane and protruding to the outside of the electrode catalyst layer on the cathode diffusion layer face side of the membrane electrode assembly and the microporous layer.

10. The fuel cell according to claim 9, further comprising a microporous layer between the membrane electrode assembly and the anode gas diffusion layer.

11. A method for manufacturing a fuel cell including: a membrane electrode assembly including an electrolyte membrane and first and second electrode catalyst layers on both faces of the electrolyte membrane; a first microporous layer, and a resin sheet holding the membrane electrode assembly, the method at least comprising:

forming the first electrode catalyst layer and the first microporous layer on a first gas diffusion layer so as to expose an outer peripheral part of the first gas diffusion layer, wherein the first electrode catalyst layer and the first microporous layer being smaller in width in plan view than the electrolyte membrane to form a step, and wherein the first gas diffusion layer being the same size or larger in width in plan view than the electrolyte membrane such that it has a first protrusion protruding to the outside of the electrolyte membrane and protruding to the outside of the first electrode catalyst layer and the first microporous layer;

stacking the electrolyte membrane on the first electrode catalyst layer and the first microporous layer for lamination;

applying adhesive on the exposed outer peripheral part of the first gas diffusion layer to form a first adhesive layer; and stacking a resin sheet to be in contact with the adhesive layer for lamination so that the first gas diffusion layer and the resin sheet bond via the first adhesive layer.

12. The method for manufacturing the fuel cell according to claim 11, further comprising: applying the second electrode catalyst layer on a second gas diffusion layer so as to expose an outer peripheral part of the second gas diffusion layer;

applying adhesive on the exposed outer peripheral part of the second gas diffusion layer to form a second adhesive layer; and disposing the second electrode catalyst layer on the electrolyte membrane on the opposite side of the first electrode catalyst layer for joining so that the resin sheet is located outside of the second gas diffusion layer.

13. A method for manufacturing a fuel cell including: a membrane electrode assembly including an electrolyte membrane and an anode electrode catalyst layer and a cathode electrode catalyst layer on both faces of the electrolyte membrane; a first microporous layer; and a resin sheet holding the membrane electrode assembly, the method comprising:

applying the anode electrode catalyst layer on an anode gas diffusion layer, the anode electrode catalyst layer being smaller than the anode gas diffusion layer, so as to expose an outer peripheral part of the anode gas diffusion layer;

stacking the electrolyte membrane for lamination on the anode electrode catalyst layer;

applying adhesive on the outer peripheral part of the anode gas diffusion layer to form a first adhesive layer;

stacking a resin sheet for lamination to be in contact with the first adhesive layer to bond the anode gas diffusion layer and the resin sheet via the first adhesive layer;

applying the cathode electrode catalyst layer on a cathode gas diffusion layer, the cathode electrode catalyst layer and the first microporous layer being smaller than the cathode gas diffusion layer, so as to form a step and expose an outer peripheral part of the cathode gas diffusion layer;

applying adhesive on the outer peripheral part of the cathode gas diffusion layer to form a second adhesive layer; and disposing the cathode electrode catalyst layer on the electrolyte membrane on the opposite side of the anode electrode catalyst layer for joining so that the resin sheet is located outside of the cathode gas diffusion layer.

* * * * *